(12) United States Patent
Lu et al.

(10) Patent No.: US 7,437,811 B1
(45) Date of Patent: Oct. 21, 2008

(54) STRUCTURE OF A DUAL DISC TYPE OF TOOL TURRET DEVICE OF A MACHINE

(75) Inventors: Yung-Hsiang Lu, Chiayi (TW); Ping-Shuo Lin, Chiayi (TW)

(73) Assignee: Far East Machinery Co., Ltd., Chiayi (TW)

( * ) Notice: Subject to any disclaimer, the term of this patent is extended or adjusted under 35 U.S.C. 154(b) by 0 days.

(21) Appl. No.: 11/812,540

(22) Filed: Jun. 20, 2007

(51) Int. Cl.
*B23P 23/02* (2006.01)
*B23B 3/16* (2006.01)
*B23B 29/30* (2006.01)
*B23B 29/32* (2006.01)
*B23B 39/20* (2006.01)

(52) U.S. Cl. .......................... 29/36; 29/40; 29/48.5 A; 74/813 R; 74/813 L; 82/121; 82/159

(58) Field of Classification Search .............. 29/36, 29/39–41, 44, 46, 48.5, 49, 48.5 A; 82/159, 82/120, 121; 74/813 R, 825, 826–827, 813 L, 74/816
See application file for complete search history.

(56) References Cited

U.S. PATENT DOCUMENTS

| 3,786,539 | A | * | 1/1974 | Foll et al. | 29/36 |
| 4,706,351 | A | * | 11/1987 | Chuang | 29/39 |
| 7,010,839 | B2 | * | 3/2006 | Lu | 29/36 |
| 7,263,915 | B2 | * | 9/2007 | Lu | 29/36 |

* cited by examiner

*Primary Examiner*—Erica E Cadugan
(74) *Attorney, Agent, or Firm*—Rosenberg, Klein & Lee (57) ABSTRACT

A dual disc type of tool turret device is powered by means of single main power source, which also serves to power the spindle of the machine; the turret device includes an inner and outer tool turrets; when power is transmitted from the main power source through a transmission element, a piston clutching piece, and rotary shaft (A), the inner turret will be rotated to carry out a tool-choosing operation; when power is further passed on to rotary shaft (B) through rotary shaft (A), the inner turret will be rotated to carry out a tool-choosing operation; after the tool-choosing action, power is supplied to the spindle of the machine in order for the machine to carry out a machining operation.

6 Claims, 9 Drawing Sheets

STRUCTURE OF A DUAL DISC TYPE OF TOOL TURRET DEVICE OF A MACHINE

BACKGROUND OF THE INVENTION

1. Field of the Invention

The present invention relates to a dual-disc type of tool turret device of a machine, more particularly one, which is powered so as to carry out a tool-choosing action of either of inner and outer tool turrets thereof by means of single main power source of the machine, which serves to power the spindle of the machine.

2. Brief Description of the Prior Art

The inventor of the present invention invented a twin disk type tool turret mechanism for CNC machines before, which was granted U.S. Pat. No. 7,010,839. The twin disk type tool turret mechanism includes internal and external tool turrets, a toothed ring secured to the internal tool turret, a central shaft secured to the external turret, a power switch, and a clutch; the central shaft has a piston fitted thereto; the power switch is used for providing power to the internal and the external turrets through the toothed ring and the shaft respectively; the clutch includes a fixed clutch claw, external and internal ring clutch claws, which are respectively securely connected to inner edge of the internal turret, and inner edge of the external turret; the ring clutch claws will rotate, and engage each other; when the piston is actuated, and displaced, the external turret will be forced to change position, and both the turrets will be left and right displaced between a first position, in which they engage the clutch, and a second position, in which they disengage the clutch. In summary, either of the internal and the external turrets is chosen, and the chosen turret will be rotated for choosing a tool therefrom subsequently.

The inventor of the present invention also invented a twin disc type tool turret device of a machine, which was filed for patent application, with application Ser. No. 11/128,204, now U.S. Pat. No. 7,263,915. The twin disc type tool turret device includes a central shaft, a piston sleeve positioned around the central shaft and having moving sticks thereon, a push rod, an actuating seat, and internal and external turrets; the piston sleeve is actuated to move left and right by means of a power source; the moving sticks are passed through a ringed sleeve, which props a push rod passed through a fixed clutch claw, and facing the actuating seat; the actuating seat includes a rotary shaft, a pivotal shaft, and a toothed ring seat; the piston sleeve can be moved such that the moving sticks and the push rod move forwards, and the rotary shaft engages the toothed ring seat for a tool of a straight tool seat to function; alternatively the piston sleeve can be moved such that the moving sticks and the push rod move backwards, and the rotary shaft disengages the toothed ring seat for allowing replacement of the toothed ring seat.

The above two devices have the following drawbacks:

1. The devices each have to be provided with two power sources therefore the cost is high.

2. The devices each have to be provided with two power sources, which would occupy much space together.

3. They have to be equipped with a switching device to choose between the two power sources in order for one of the internal and external turrets to be rotated.

4. The spindle length is relatively short, and the spindle is too close to the bed. Consequently, it isn't possible for other tools to be provided in a reverse direction without interference, which would cause damage to the machine as well as the tools; in other words, machining action is only allowed in a forward direction.

SUMMARY OF THE INVENTION

It is a main object of the present invention to provide an improvement on a dual disc type of tool turret device of a machine to overcome the above problems.

A dual disc type of tool turret device according to an embodiment of the present invention is powered by means of single main power source of the machine, which serves to power the spindle of the machine. The turret device includes an inner tool turret, and an outer tool turret; when power is transmitted from the main power source through a transmission element, a piston clutching piece, and rotary shaft (A), the inner turret will be rotated to carry out a tool-choosing operation; when power is further passed on to rotary shaft (B) through rotary shaft (A), the inner turret will be rotated to carry out a tool-choosing operation. After the tool-choosing action, power is supplied to the spindle in order for the machine to carry out a machining operation. Therefore, the turret device of the present invention has a relatively low fabrication cost, and don't have an additional power source to occupy space.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
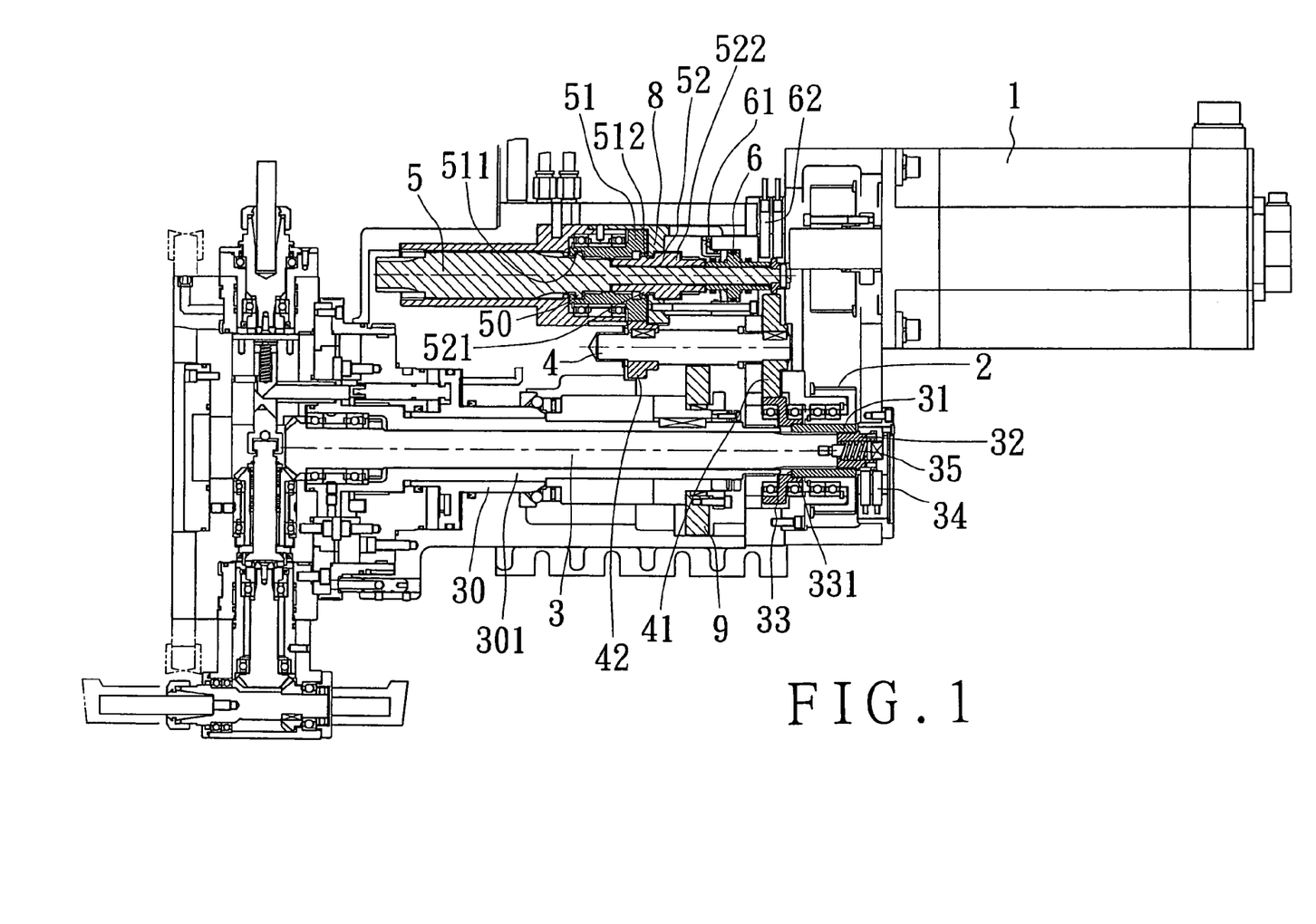
FIG. 1 is a sectional view of the dual disc type of tool turret device of the present invention.
Figure 2:
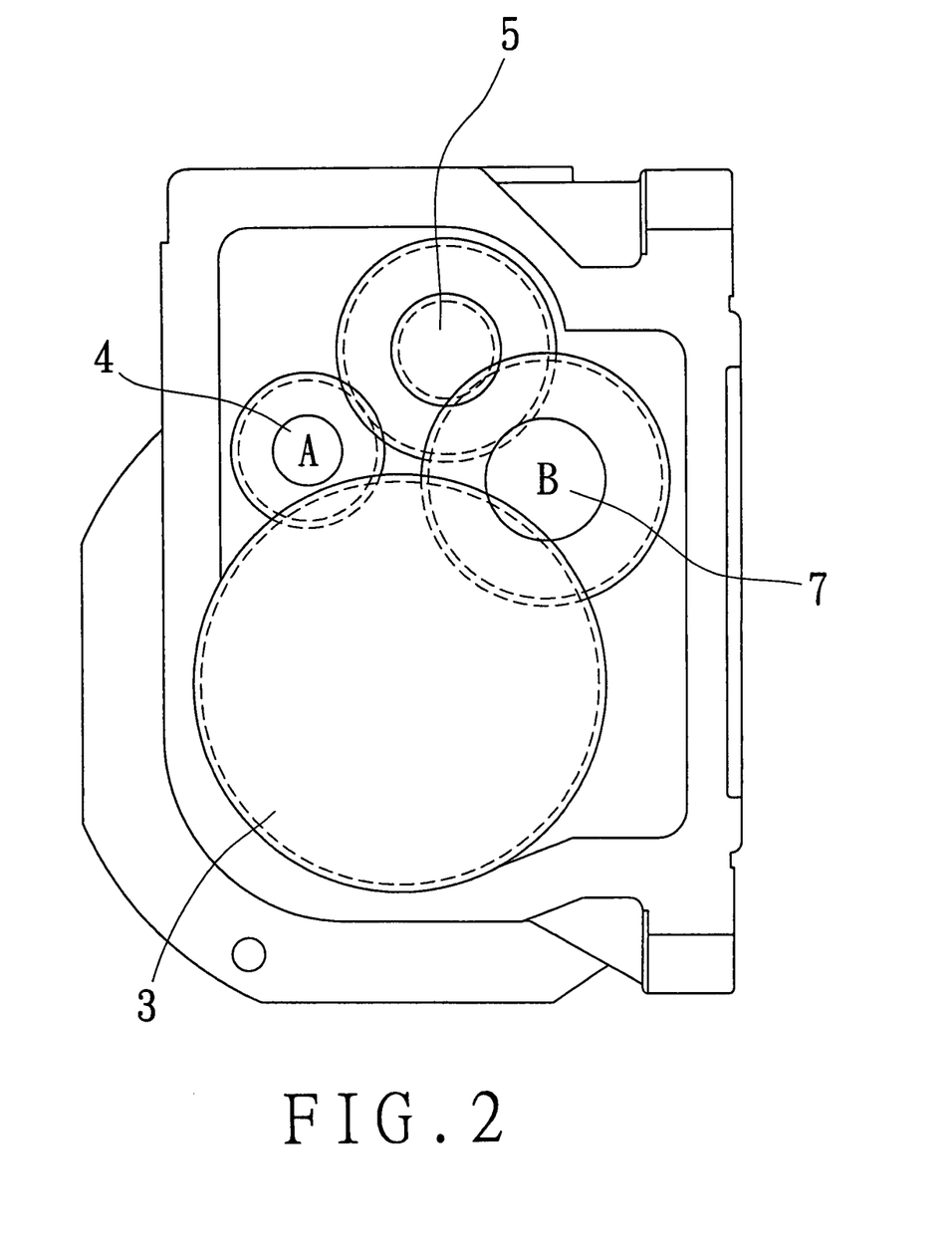
FIG. 2 is a side view of the present invention.

Referring to FIG. 1, a preferred embodiment of a dual disc type of tool turret device of a machine includes:

a power mechanism 2 to receive power from a main power source 1 on a bed of a machine, which main power source 1 is a servomotor;

a toothed ring 31 positioned around a spindle 3 of the machine; a piston set 30 is arranged outside the spindle 3;

a sleeve 301 on an outer side of the spindle 3;

a rotary shaft (A) 4;

a toothed member 42; the toothed member 42 is positioned on a front end of the rotary shaft (A) 4 so that when the main power source 1 is actuated, power of the main power source 1 will be passed on to the rotary shaft (A) 4 through the power mechanism 2 and the toothed ring 31, thus causing motion of the toothed member 42 on the rotary shaft (A) 4;

an inner tool turret;

a rotary shaft 5 for causing rotation of the inner tool turret; the rotary shaft 5 of the inner tool turret has a transmission element 51 thereon; when the main power source 1 is actuated, the power of the main power source 1 will be first passed on to the toothed member 42 on the rotary shaft (A) 4, and next transmitted to the transmission element 51 through the toothed member 42;

an outer tool turret;

a rotary shaft (B) 7 for causing rotation of the outer tool turret; the rotary shaft (B) 7 has an outer toothed portion 72;

a piston clutching piece 6 on a tail end of the rotary shaft 5 of the inner tool turret; the piston clutching piece 6 is used together with the transmission element 51 for choosing between the rotary shaft 5 of the inner tool turret and the rotary shaft (B) 7 of the outer tool turret so that one of the inner and the outer tool turrets can be operated for choosing a tool for the next machining process; and a detecting unit 62 for detecting displacement of the piston clutching piece 6 so as to help find out whether the piston clutching piece 6 has been displaced properly.

Figure 3:
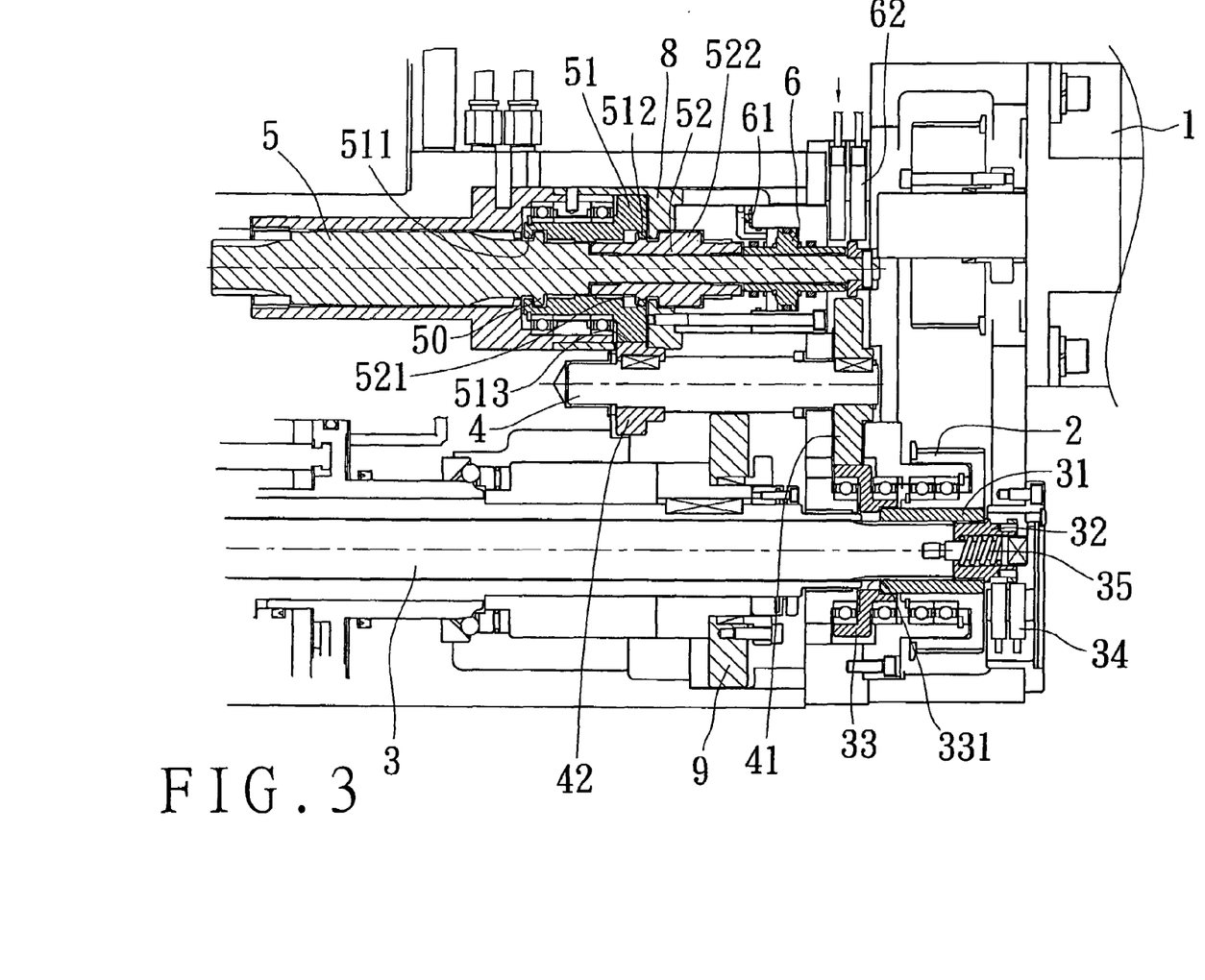
FIG. 3 is a partial sectional view of the present invention.

Furthermore, referring to FIG. 3 as well, the dual disc type of tool turret device includes:

a clutching seat 32 on a tail end of the spindle 3 to push and cause displacement of the toothed ring 31;

an outer rotary member 33 positioned on the spindle 3, next to the toothed ring 31; the outer rotary member 33 has inner teeth 331;

an elastic element set 35 arranged inside the clutching seat 32, next to the spindle 3;

a detecting unit 34 arranged next to the clutching seat 32 for detecting displacement of the clutching seat 32; the detecting unit 34 will produce a stop signal for making the machine stop running if the clutching seat 32 hasn't been displaced properly to result in the toothed ring 31 failing to engage the inner teeth 331 of the outer rotary member 33;

a co-moving piece 41 arranged on a tail end of the rotary shaft (A) 4 and engaged with the outer rotary member 33; the co-moving piece 41 is engaged with the transmission element 51 of the rotary shaft 5 of the inner tool turret;

the transmission element 51 of the rotary shaft 5 has front and rear inner toothed portions 511, and 512, and an outer toothed portion 513; the rotary shaft 5 has an outer toothed portion 50 at a front end thereof;

a sleeve seat 52 on the rotary shaft 5; the sleeve seat 52 has first and second toothed portions 521, and 522 on an outer portion;

a ringed piece 71 positioned around the rotary shaft (B) 7;

a fixing base 8 fixed to the bed of the machine;

a sleeve 9 on the spindle 3 for helping to cause rotation of the outer tool turret; and a power mechanism 61 provided for causing displacement of the piston clutching piece 6; the power mechanism 61 can be a hydraulic/oil hydraulic device.

The piston clutching piece 6 can be displaced so as to move the rotary shaft 5 to a first position, wherein the outer toothed portion 50 of the rotary shaft 5 of the inner tool turret engages the front inner toothed portion 511 of the transmission element 51, and the first toothed portion 521 of the sleeve seat 52 separates from the rear inner toothed portion 512 of the transmission element 51, and the second toothed portion 522 of the sleeve seat 52 engages the fixing base 8 fixed on the bed of the machine; thus, power is passed on to the rotary shaft 5 of the inner tool turret through the transmission element 51 so as to rotate the inner tool turret for allowing a tool to be chosen for a machining process.

Figure 6:
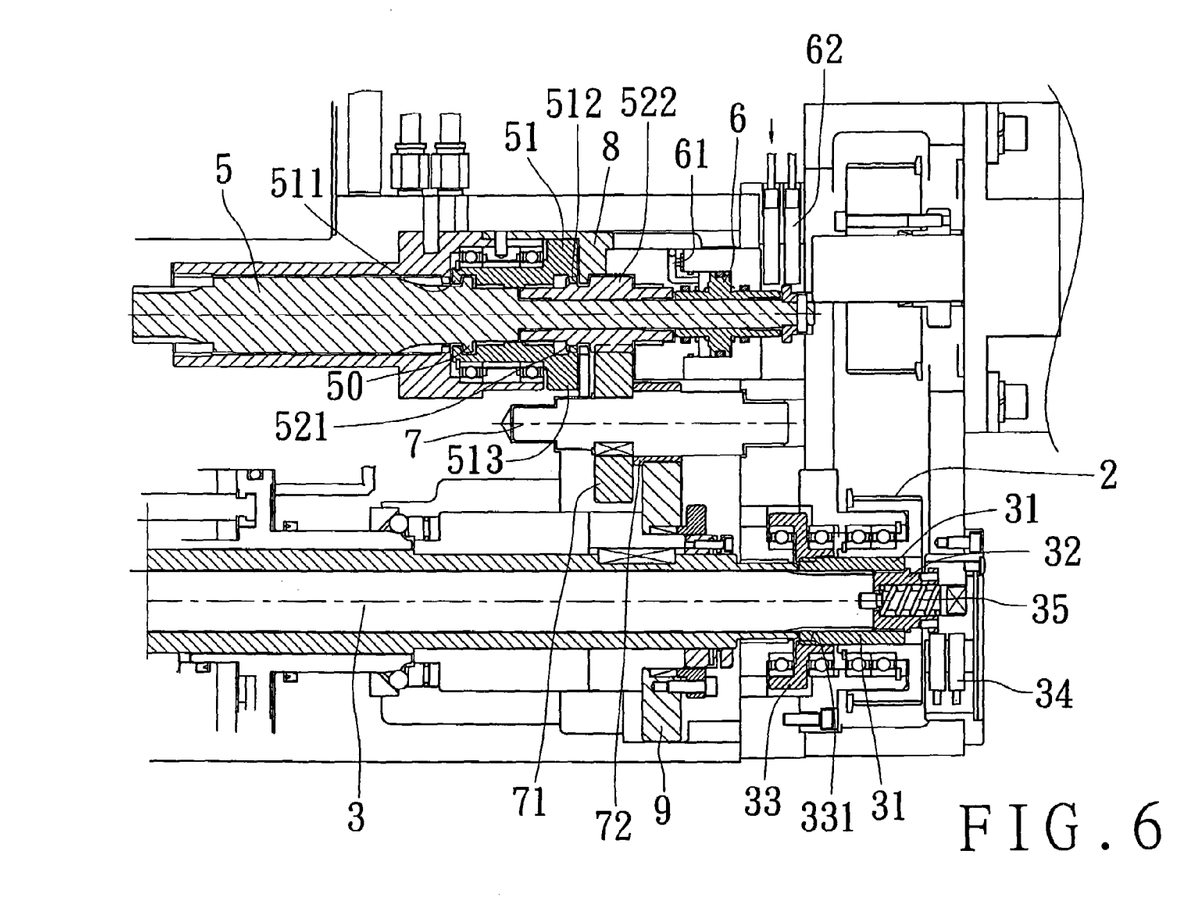
FIG. 6 is a view of the present invention in operation (2)
Figure 7:
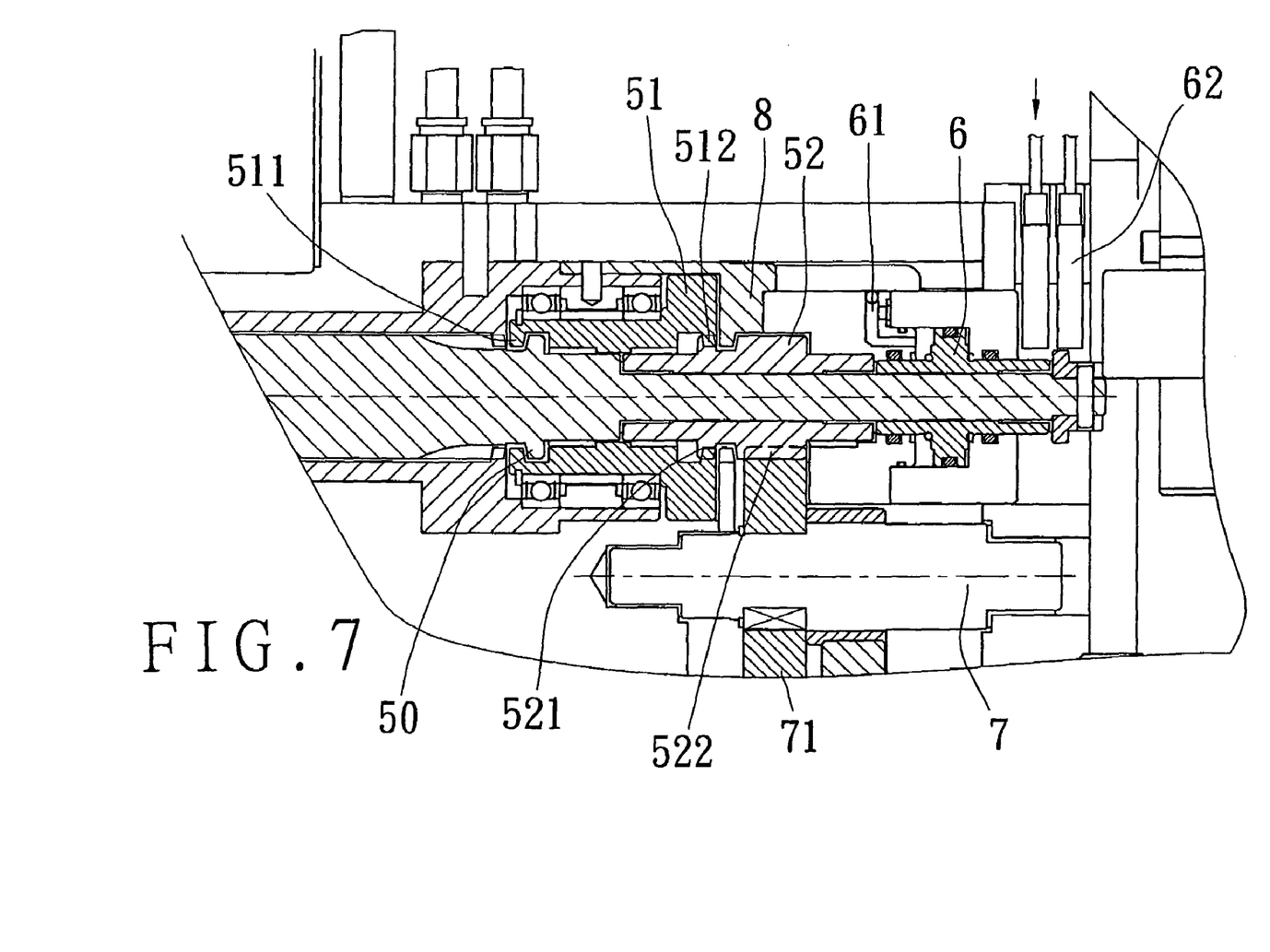
FIG. 7 is a partial enlarged view of the invention in operation.

Alternatively, the piston clutching piece 6 can be displaced so as to move the rotary shaft 5 to a second position, wherein the outer toothed portion 50 of the rotary shaft 5 of the inner tool turret separates from the front inner toothed portion 511 of the transmission element 51, and the first toothed portion 521 of the sleeve seat 52 engages the rear inner toothed portion 512 of the transmission element 51, and the second toothed portion 522 of the sleeve seat 52 engages the ringed piece 71 around the rotary shaft (B) 7, and the outer toothed portion 72 of the rotary shaft (B) 7 engages the sleeve 9 on the spindle 3; thus, power is passed on to the rotary shaft (B) 7 of the outer tool turret so as to rotate the outer tool turret for allowing a tool to be chosen for a machining process (FIG. 6).

Figure 4:
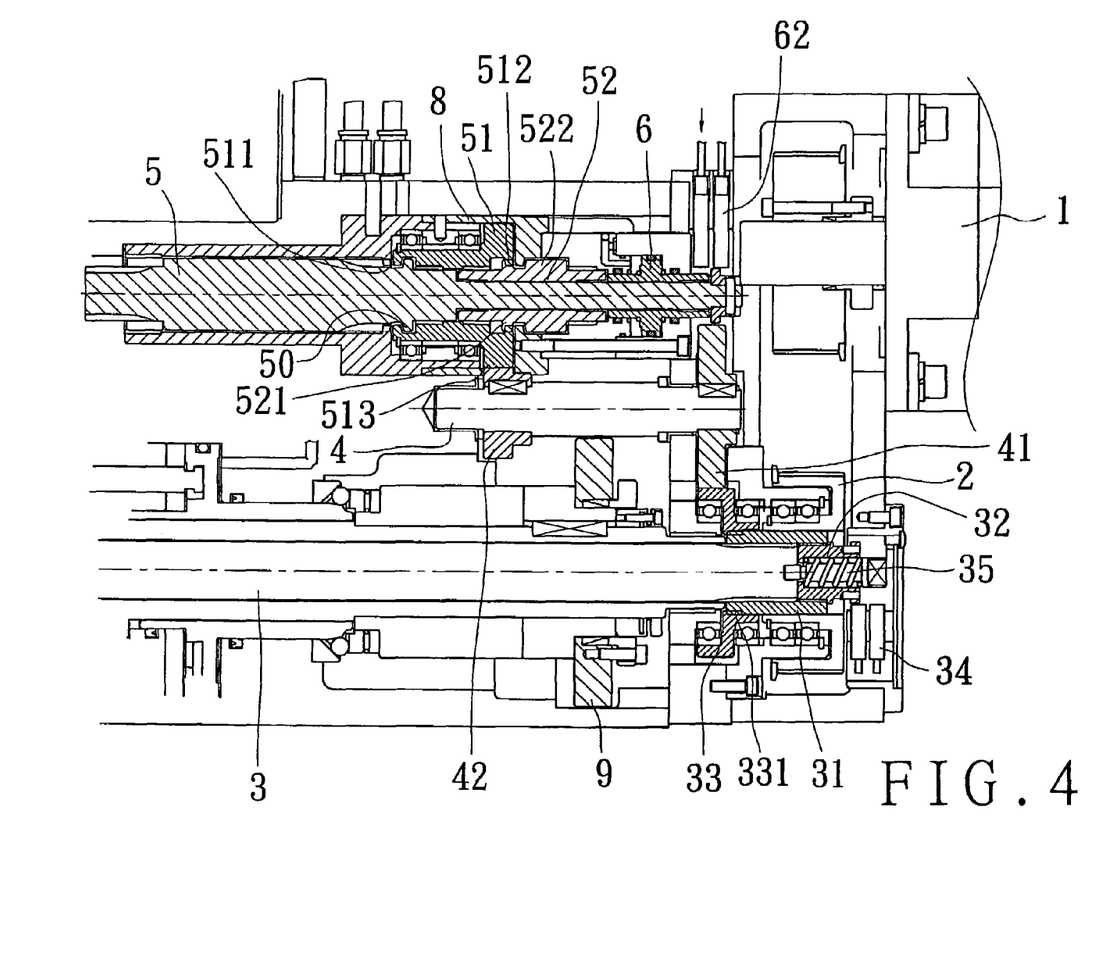
FIG. 4 is a view of the present invention in operation (1)
Figure 5:
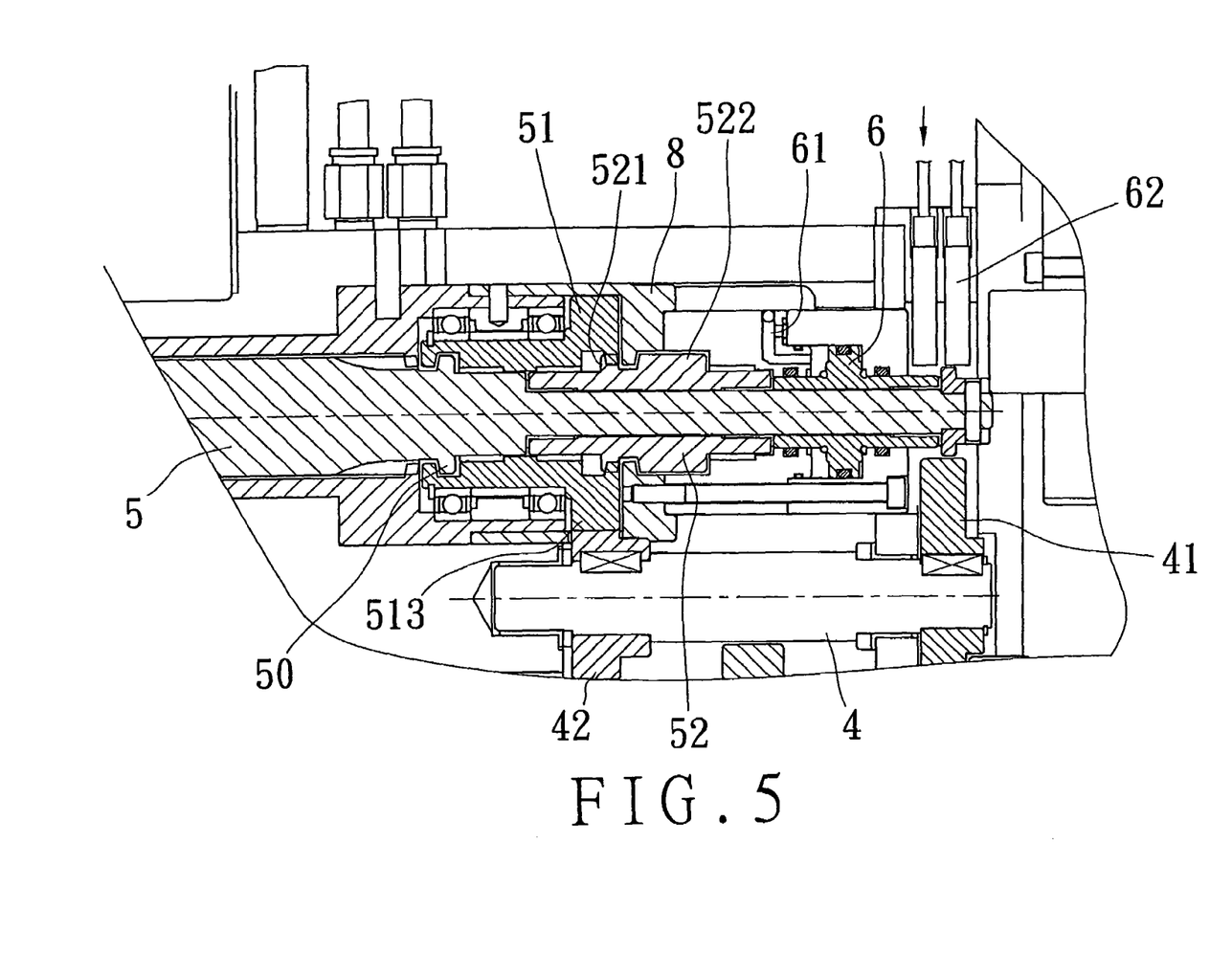
FIG. 5 is a partial enlarged view of the invention in operation.

Shown in FIG. 4 is a part of the dual disk type of the tool turret device of the present invention, which is currently under a first step of operation. In the first step of operation, first, fluid is guided onto the spindle 3 so as to make the piston set 30 arranged outside the spindle 3 push the sleeve 301 on the spindle 3; because the sleeve 301 is securely joined to the tool turrets, the tool turrets will be pushed outwards at the same time; furthermore, because the spindle 3 is within the sleeve 301, the spindle 3 and the clutching seat 32 arranged on the tail end of the spindle 3 will move forwards together owing to the motion of the tool turrets. The forward motion of the clutching seat 32 will push the toothed ring 31 so as to make the toothed ring 31 engage the inner teeth 331 of the outer rotary member 33. At the same time, the elastic element 35 will provide elasticity between the inner teeth 331 and the toothed ring 31, thus preventing the inner teeth 331 and the toothed ring 31 from getting damaged and preventing insufficient displacement. Referring to FIG. 5 as well, if the clutching seat 32 hasn't been displaced properly to result in an error, wherein the toothed ring 31 fails to engage the inner teeth 331 of the outer rotary member 33, the detecting unit 34 will produce a stop signal for making the machine stop running, thus preventing improper machining and danger from happening. Because the main power source 1 is a servomotor, when the piston set 30 push the sleeve 301 on the spindle 3 under such a condition, the power source is in stopped condition, and the fluid will push the clutching seat 32 so as to make the toothed ring 31 engage the inner teeth 331 of the outer rotary member 33.

Referring to FIGS. 5 and 6, after the outer rotary member 33 is made to rotate by means of the toothed ring 31, power will be passed on to the co-moving piece 41 on the tail end of the rotary shaft (A) 4. When the rotary shaft (A) 4 is rotated, the toothed member 42 on the front end of the rotary shaft (A) 4 will be rotated together with it, and power will be passed on to the transmission element 51 on the rotary shaft 5 of the inner tool turret, with the outer toothed portion 513 of the transmission element 51 engaging the toothed member 42. When the transmission element 51 is being rotated, and the piston clutching piece 6 isn't pushing the rotary shaft 5 of the inner tool turret forwards, the rear inner toothed portion 512 of the transmission element 51 will be engaged with the first toothed portion 521 of the sleeve seat 52 such that the transmission element 51 is moved. And, after the sleeve seat 52 starts rotating, the second toothed portion 522 of the sleeve seat 52 will engage the ringed piece 71 on the rotary shaft (B) 7 so as to cause rotation of the rotary shaft (B) 7. Thus, the rotary shaft (B) 7 engages the sleeve 9 on the spindle 3 at the outer toothed portion 72 thereof, and next the sleeve 9 is rotated so as to cause motion of the outer tool turret on the spindle 3 for allowing a tool to be chosen from the outer tool turret for a machining process; the motion of the outer tool turret on the spindle 3 has been mentioned in the prior arts, U.S. Pat. No. 7,010,839, and U.S. patent application Ser. No. 11/128,204, therefore it won't be detailed hereinafter.

Figure 8:
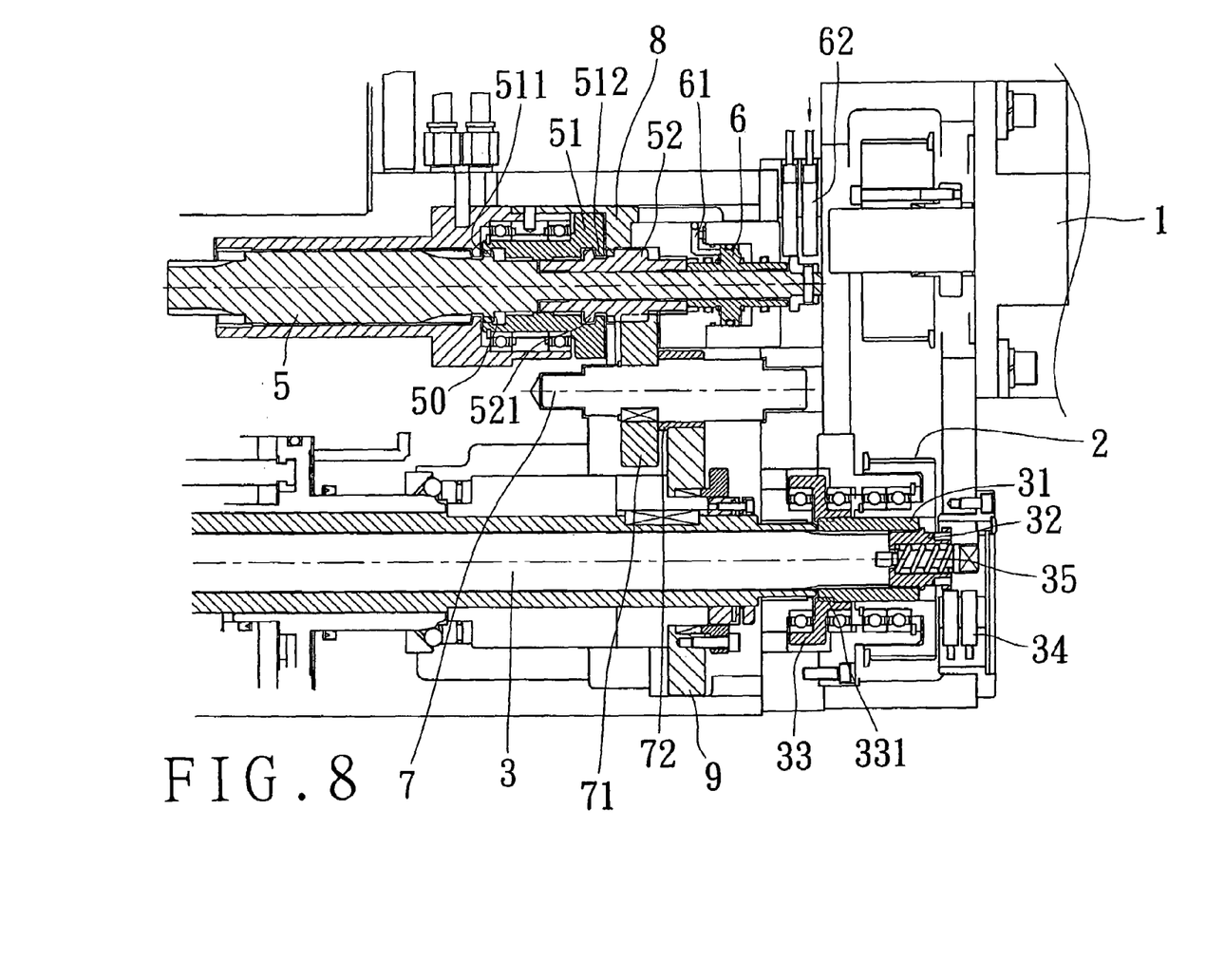
FIG. 8 is a view of the present invention in operation (3)
Figure 9:
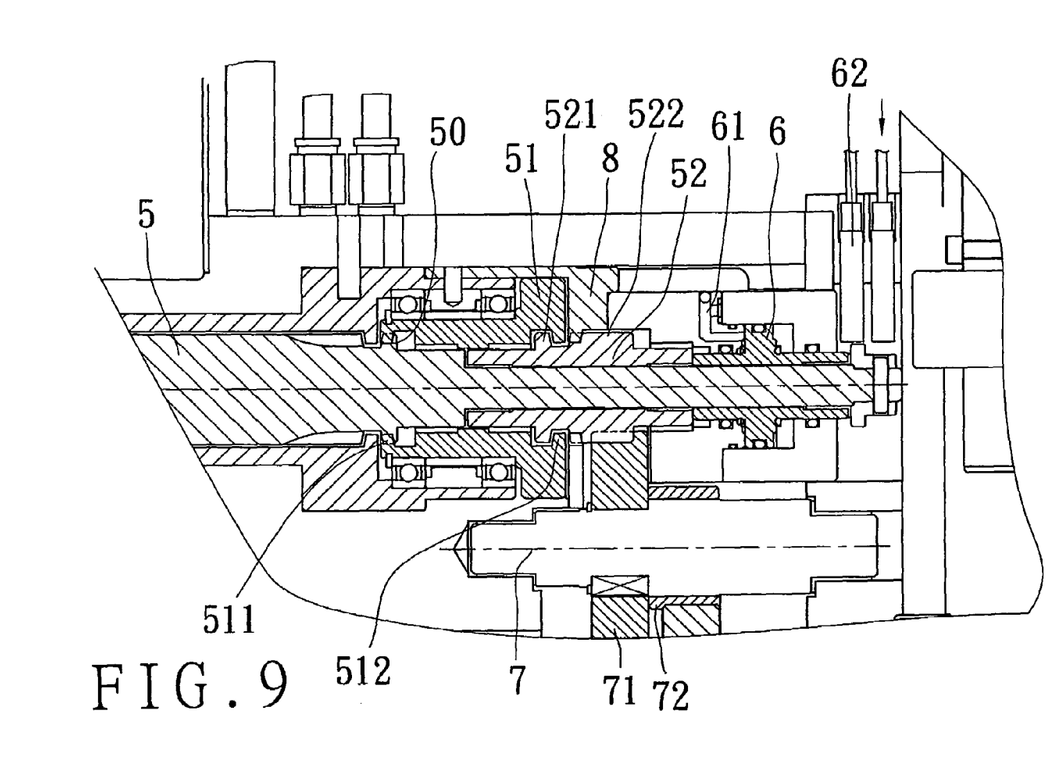
FIG. 9 is a partial enlarged view of the invention in operation.

Shown in FIG. 8 is the present invention under operation for a tool to be chosen from the inner tool turret; the main power source 1 sends out power, which is passed on through the power mechanism 2 so as to cause motion of the toothed ring 31, the outer rotary member 33, and the co-moving piece 41 of the rotary shaft (A) 4 in sequence. At the same time, the toothed member 42 on the rotary shaft (A) 4 will cause rotation of the transmission element 51 on the rotary shaft 5 of the inner tool turret. When the transmission element 51 is rotating, the power mechanism 61 will cause displacement of the piston clutching piece 6 on the tail end of the rotary shaft 5 of the inner tool turret, and the detecting unit 62 will detect the displacement of the piston clutching piece 6 to help find out whether the piston clutching piece 6 is displaced properly. Immediately after the piston clutching piece 6 pushes and causes forward displacement of the rotary shaft 5 of the inner tool turret and the sleeve seat 52, the first toothed portion 521 of the sleeve seat 52 will separate from the rear inner toothed portion 512 of the transmission element 51, and the second toothed portion 522 of the sleeve seat 52 will engage the fixing base 8 fixed on the bed of the machine; thus, the sleeve seat 52 is stopped and fixed, and in turn power can't be passed on to cause rotation of the rotary shaft (B) 7 through the sleeve seat 52, and the outer tool turret is still. Next, the rotary shaft 5 of the inner tool turret will be pushed forwards, and engaged with the front inner toothed portion 511 of the transmission element 51 at the outer toothed portion 50 of the front end thereof. Consequently, power is passed on to the rotary shaft 5 through the transmission element 51, and the inner tool turret is rotated for carrying out a tool-choosing operation.

In summary, power can be supplied to the spindle 3 for the spindle 3 to rotate, and the machine to carry out a machining operation. Or alternatively, power can be passed on to either the inner tool turret or the outer tool turret through the spindle 3 by means of controlling the piston clutching piece 6 in order for the piston clutching piece 6 to move forwards/rearwards. The present invention applies to a single-disc type of tool turret; in such a case, power is supplied to the spindle, and passed on to the tool turret to carry out a tool-choosing operation.

Referring to FIG. 1, the spindle length of the machine is increased; thus, other tools can be provided in a reverse direction without interference, which tools can be used for a reverse machining action when the outer tool turret is under tool-choosing and machining operation. Consequently, the machine can be equipped with more different tools for a machining process.

From the above description, it can be seen that the dual disc type of tool turret device of the present invention has the following advantages over the prior arts:

1. The operation of choosing between the inner and the outer tool turrets of the present invention is powered by means of single main power source. Therefore, as compared with the prior arts, the present invention has a relatively simple structure, not having an additional power source to occupy space.

2. The operation of choosing between the inner and the outer tool turrets of the present invention is powered by means of single main power source. Therefore, the expense taken to fabricate the present invention is relatively low because the present invention is equipped with single motor.

3. The operation of choosing between the inner and the outer tool turrets of the present invention is powered through the piston clutching piece by means of single main power source. Therefore, the present invention has a relatively simple structure and a relatively low fabricating cost as compared with the prior arts, which comprise two power sources, a switch and a clutch to choose between the two power sources.

4. The single main power source serves to actuate a chosen turret besides providing power to the operation of choosing between the inner and the outer tool turrets.

5. The spindle length of the machine bed of the present invention is increased. Therefore, other tools can be provided in a reverse direction without interference, which tools can be used for a reverse machining action when the outer tool turret is under tool-choosing and machining operation. And, the machine can be equipped with more different tools.

What is claimed is:

1. A dual disc type of tool turret device of a machine, comprising
   a power mechanism to receive power from a main power source on a bed of a machine;
   a toothed ring positioned around a spindle of the machine;
   a first rotary shaft;
   a toothed member; the toothed member being positioned on a front end of the first rotary shaft so that when the main power source is actuated, power of the main power source will be passed on to the first rotary shaft through the power mechanism and the toothed ring, thus causing motion of the toothed member on the first rotary shaft;
   an inner tool turret;
   a second rotary shaft for causing rotation of the inner tool turret;
   the second rotary shaft having a transmission element thereon; when the main power source is actuated, the power of the main power source being going to be first passed on to the toothed member on the first rotary shaft, and next transmitted to the transmission element through the toothed member;
   an outer tool turret;
   a third rotary shaft for causing rotation of the outer tool turret; the third rotary shaft has an outer toothed portion;
   a piston clutching piece on a tail end of the second rotary shaft; the piston clutching piece being used together with the transmission element for choosing between the second rotary shaft and the third rotary shaft so that one of the inner and the outer tool turrets is operated for choosing a tool for a next machining process;
   a detecting unit for detecting displacement of the piston clutching piece so as to help find out whether the piston clutching piece has been displaced properly;
   a clutching seat on a tail end of the spindle to push and cause displacement of the toothed ring;
   an outer rotary member positioned on the spindle, next to the toothed ring;
   a co-moving piece arranged on a tail end of the first rotary shaft and engaged with the outer rotary member; the co-moving piece being engaged with the transmission element of the second rotary shaft;
   the transmission element of the second rotary shaft having front and rear inner toothed portions, and an outer toothed portion; the second rotary shaft having an outer toothed portion at a front end thereof;
   a sleeve seat on the second rotary shaft; the sleeve seat having first and second toothed portions on an outer portion;
   a ringed piece positioned around the third rotary shaft;
   a fixing base fixed to the bed of the machine;
   a sleeve on the spindle for helping to cause rotation of the outer tool turret; and
   a second power mechanism provided for causing displacement of the piston clutching piece.

2. The dual disc type of tool turret device of a machine as claimed in claim 1, wherein a detecting unit is arranged next to the clutching seat for detecting displacement of the clutching seat.

3. The dual disc type of tool turret device of a machine as claimed in claim 1, wherein the outer rotary member has plural inner teeth to engage the toothed ring.

4. The dual disc type of tool turret device of a machine as claimed in claim 1, wherein an elastic element set is arranged next to the spindle inside the clutching seat.

5. The dual disc type of tool turret device of a machine as claimed in claim 1, wherein the transmission element has an outer toothed portion to engage the toothed member.

6. The dual disc type of tool turret device of a machine as claimed in claim 1, wherein the second power mechanism is a hydraulic device.

* * * * *